C. E. SAYRE.
DRIVE MECHANISM.
APPLICATION FILED FEB. 3, 1920.
1,360,691.
Patented Nov. 30, 1920.
2 SHEETS—SHEET 1.
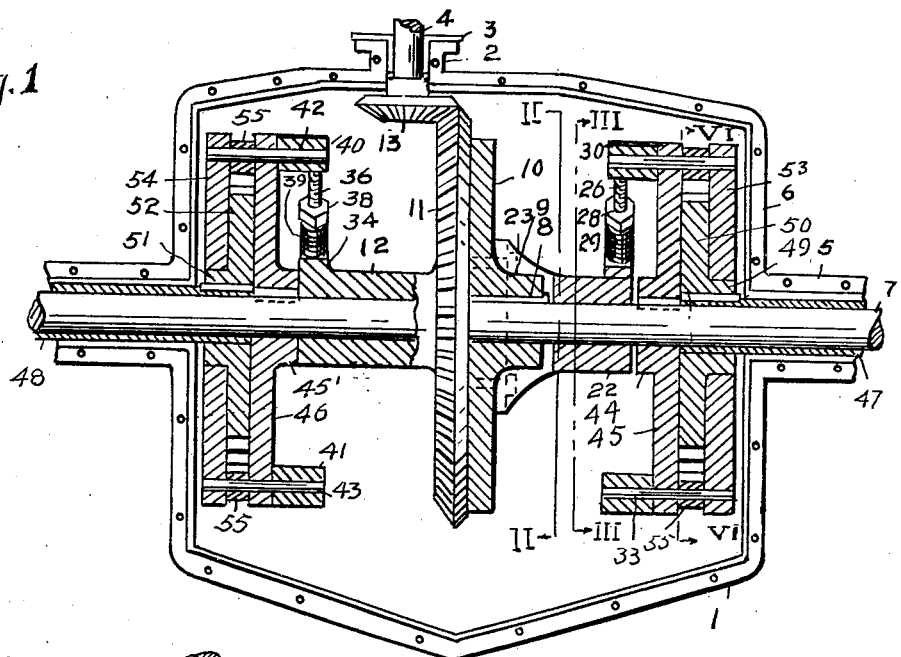

C. E. SAYRE.
DRIVE MECHANISM.
APPLICATION FILED FEB. 3, 1920.
1,360,691.
Patented Nov. 30, 1920.
2 SHEETS—SHEET 2.
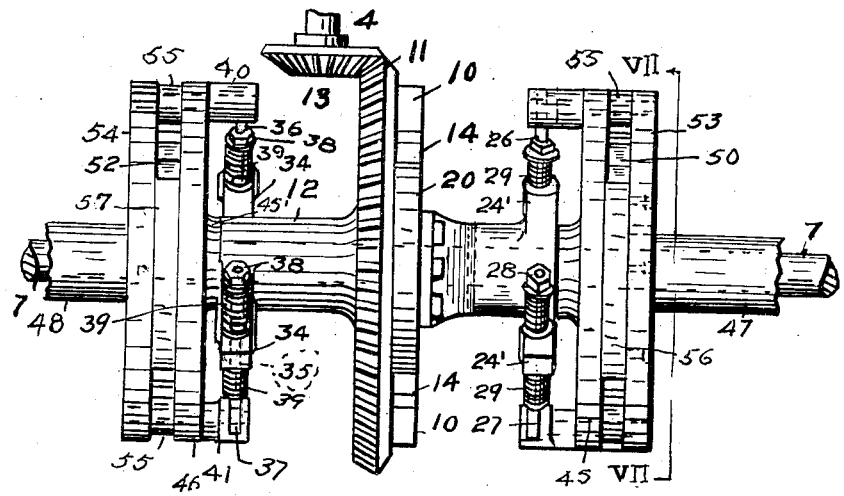
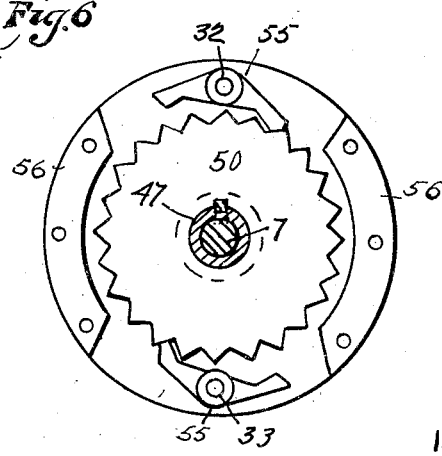
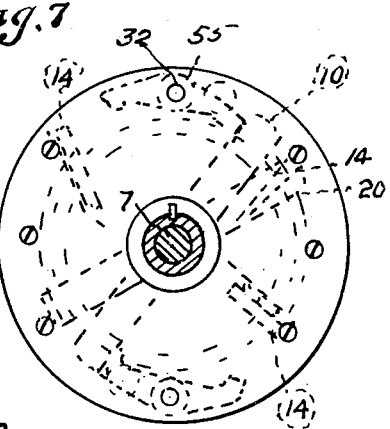
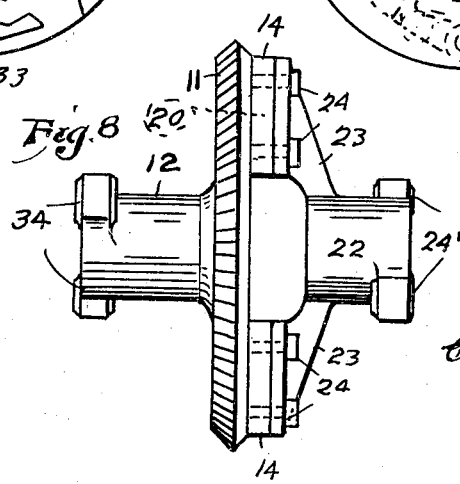
Witness
R.F. Dilworth
Inventor
Charles Ethel Sayre
By Jack Snyder
Attorney

UNITED STATES PATENT OFFICE.

CHARLES ESHEL SAYRE, OF PITTSBURGH, PENNSYLVANIA.

DRIVE MECHANISM.

1,360,691.  Specification of Letters Patent.  Patented Nov. 30, 1920.

Application filed February 3, 1920. Serial No. 355,925.

*To all whom it may concern:*

Be it known that I, CHARLES ESHEL SAYRE, a citizen of the United States, residing at Pittsburgh, in the county of Allegheny and State of Pennsylvania, have invented certain new and useful Improvements in Drive Mechanisms, of which the following is a specification.

This invention relates to transmission mechanisms of that class designed primarily for motor vehicles, but it is to be understood that the transmission mechanism forming the subject matter of this application can be employed for any purposes wherein it is found applicable, and the invention has for its object to provide, in a manner as hereinafter set forth, a transmission mechanism having means whereby if one of the rear wheels of the vehicle becomes damaged or useless traction can be obtained from the other wheel whereby the vehicle can be propelled to the point desired.

A further object of the invention is to provide a transmission mechanism for the rear axle or wheels of a motor vehicle having means, in a manner as hereinafter set forth, to cause compensating traction of the rear wheels relative to each other when the vehicle is rounding a curve.

A further object of the invention is to provide a transmission mechanism for the rear wheels of a motor vehicle, having means, in a manner as hereinafter set forth, whereby the rear wheels are not only driven from a gear transmission forming a part of the mechanism but also from the rear axle.

Further objects of the invention are to provide, in a manner as hereinafter set forth, a transmission mechanism for motor vehicles which is simple in its construction and arrangement, strong, durable, efficient in its use, readily assembled, and comparatively inexpensive to set up.

With the foregoing and other objects in view the invention consists of the novel construction, combination and arrangement of parts as hereinafter set forth and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1, is a longitudinal sectional view of a transmission mechanism in accordance with this invention.

Fig. 2, is a section on line II—II Fig. 1 looking in the direction of the arrows as applied to said line.

Fig. 3, is a section on line III—III Fig. 1 looking in the direction of the arrows as applied to said lines.

Fig. 4, is a sectional detail illustrating one of the abutment elements.

Fig. 5, is a top plan view of the mechanism.

Fig. 6, is a detail illustrating the ratchet drive, on line VI—VI, Fig. 1.

Fig. 7, is a section on line VII—VII Fig. 5.

Fig. 8, is a detail illustrating the gear drive unit.

Referring to the drawings in detail 1 denotes one of the sections of a two sectional transmission casing, the other section is not shown, and said section 1 has a semi-circular extension 2, provided with a half-bushing or bearing 3, for an operating or drive shaft 4. The section of the casing, not shown, is similar in construction as the section shown. The section 1, of the casing, at each end is formed with a semi-circular extension 5, and is further flanged throughout, as at 6. When the two sections of the casing are secured together, by connecting together the flanges thereof, through the medium of suitable securing devices, the extensions 2 provide a collar and the extension 5 a cylindrical sleeve.

Extending through the casing centrally thereof and projecting beyond the sleeves formed by the extension 5, is an axle 7, having keyed thereto, as at 8, the hub 9, of an actuating member 10, the latter being positioned in close proximity to one face, of a gear wheel 11, having a hub 12 extending from the other face thereof and which is loosely mounted on the axle 7. Meshing with and driving the gear 11, is a pinion 13, carried on that end of the shaft 4, which extends into the transmission casing.

The actuating member 10 is formed of a pair of radially disposed rectangular arms, and which are adapted to be engaged by cushioned abutment elements, carried on that face of the gear 11, with which the actuating member 10 is arranged in close proximity. The actuating member is arranged in the path of the abutment elements whereby when the gear 11, is revolved by the pinion 13, the abutment elements will impact against the actuating member 10 and revolve the axle 7.

Two pair of abutment elements are employed, and the elements of one pair are oppositely disposed with respect to the elements of the other pair. Each abutment element comprises a beveled block 14, see Fig. 4, having a series of pockets 15, with the bottom of each thereof formed with an opening 16. The mouth of each of the pockets is directed toward an edge of an arm of the actuating member. Extending through each opening 16, is the shank of a headed bolt, the shank is indicated at 17 and the head of the bolt, at 18. The heads of the bolts are arranged in the pockets 15. The threaded end of each of the bolts is secured at 19, in one edge of an offset 20, which is integral with the face of the gear wheel 11. Two offsets 20 are employed and they are diametrically disposed relative to each other and with respect to the gear wheel 11. The offsets 20 are quadrangular in contour, and each offset associates with an abutment element of each pair of abutment elements. Surrounding the shanks 17, of the bolts, and interposed between one edge of an offset 20 and the rear face of the block 14 are coiled cushioning springs 21, the function of which is to maintain the blocks extended relative to the offsets and to further cushion the impacting stroke of the blocks when brought to engagement with the actuating member. The arrangement of the abutment elements of each pair with respect to the actuating member is that an abutment element of each pair will engage the arms of the actuating member. The abutment elements of each pair are oppositely disposed relative to each other so that when the gear is revolving in one direction an abutment element of each pair only becomes active, and when revolving in the opposite direction the other abutment element of each pair becomes active, and by this arrangement the axle 7 is driven in either direction, forward or reverse.

Loosely mounted on the axle 7, is a collar 22, provided with a pair of arms 23, which are connected by the securing devices 24, to the offsets 20. The arms 23 are oppositely disposed and provide means for revolving the collar 22, on the axle 7, when the gear wheel 11 is revolved. The collar 22 is furthermore provided with a pair of radially disposed arms 24', each of which is formed with an opening 25, near its outer end. Extending through the openings 25 are oppositely disposed rods, which are indicated at 26, 27. These rods are threaded and each carry a pair of adjusting nuts 28, positioned one near each end of a rod. Mounted on each rod and interposed between the nuts 28 and an arm 24 are coiled cushioning springs 29. The nuts 28 provide for the adjusting of the tension of the springs 29.

The reference characters 30, 31, denote a pair of oppositely disposed cranks, the former is connected to the short shaft 32 and the latter to the short shaft 33. The rod 26 is connected to the crank 30 and the rod 27 to the crank 31.

The hub 12, is provided with a pair of radially disposed arms 34, each of which is formed with an opening 35, near its outer end. Extending through the openings 35 are oppositely disposed rods, which are indicated at 36, 37. These rods are threaded and each carry a pair of adjusting nuts 38, positioned one near each end of a rod. Mounted on each rod and interposed between the nuts 38 and the arms 34 are coiled cushioning springs 39. The nuts 38 provide for adjusting the tension of the springs 39. The reference characters 40, 41, denote a pair of oppositely disposed cranks, the former is connected to the shaft 42 and the latter to the shaft 43. The rod 36 is connected to the crank 40 and the rod 37 to the crank 41.

Keyed to the axle 7 in proximity to the collar 22 is the hub 44 of a disk 45, and keyed to the axle 7, in proximity to the hub 12, is the hub 45' of a disk 46. Mounted on the end portions of the axle 7, is a pair of elongated sleeves 47, 48 which project beyond the extensions 5 and each of which carries or drives a wheel of the vehicle. The sleeve 47 extends to the hub 44 and the sleeve 48 to the hub 45'. Keyed to the sleeve 47 is a hub 49 of a ratchet wheel 50, which is positioned in proximity to the disk 45, and keyed to the sleeve 48 is the hub 51 of a ratchet wheel 52, which is positioned in proximity to the disk 46. Loosely mounted on the hub 49 is a disk 53 and on the hub 51 a disk 54. The disks 53 and 54 are circular and of greater diameter than the ratchet wheels 50, 51, and of the same diameter as the disks 45, 46. The ratchet wheel 50 is positioned between the disks 45, 53 and the ratchet wheel 52 between the disks 46, 54.

The shafts 32 and 33 are journaled in the disks 45, 53 and the shafts 42, 43 in the disks 46, 54. Fixed to the shafts 32, 33, 42, 43 are the dogs or pawls 55, each of which is provided with a pair of noses and each of which can be shifted by its respective shaft to cause either of the noses to engage a ratchet wheel and by this arrangement the dogs are utilized to drive in either direction, forward or reverse. The dog on the shaft 32 is oppositely disposed with respect to the dog on the shaft 33, and a like arrangement is had relative to the dogs on the shafts 42, 43.

Arranged between the disks 45, 53, are combined spacing and filling members 56, and such members, indicated at 57 are positioned between the disks 46, 54. The filling or spacing members 56 and the disks 45, 53 are secured together, and the filler or spacing members and disks 46, 54 are secured together.

By the construction set forth, when the gear wheel 11 is operated the collar 22 and hub 12 will be revolved, and as the axle 7 is operated from the engagement of the abutment elements with the actuating member, the disks 45, 46, 53, 54 will be carried with the axle 7. As the hub 12 and collar 22 revolve the disks 45, 46, 53, 54, the dogs, being in engagement with the ratchet wheels, will carry the latter thereby revolving the sleeves 47, 48 and the wheels mounted on the sleeves.

What I claim is:—

1. A transmission for the purpose set forth a rear axle, a pair of revoluble sleeves mounted thereon and adapted to drive the rear wheels of a vehicle, an actuating member for said axle, an axle driving element having cushioned abutments impacting with said member to operate the axle, and an operative drive connection between said element and sleeves and said axle and sleeves.

2. A transmission for the purpose set forth comprising a rear axle, a gear wheel loosely mounted thereon and provided with cushioned abutments, an axle actuating member adapted to be engaged by said abutments for operating the axle, a pair of sleeves revolubly mounted on the axle and adapted to drive the rear wheels of a vehicle, a pair of ratchet elements for revolving the sleeves, an operative drive connection between said wheel and ratchet elements, and an operative drive connection between said axle and ratchet elements.

3. A transmission mechanism for the purpose set forth comprising a pair of revoluble sleeves, an axle extending therethrough and provided with an actuating member therefor, a revoluble gear loosely mounted on the axle and having cushioned abutments engaging with and operating said member, ratchet elements fixed to said sleeves for revolving them, an operative connection between the axle and said ratchet elements, and an operative drive connection between said gear and said ratchet elements, said last mentioned drive connection being resilient.

4. A transmission mechanism for the purpose set forth comprising an axle, a driven gear loosely mounted thereon, an actuating member fixed to the axle, cushioned abutments carried on one face of the gear and impacting against said member for driving the axle, revoluble wheel driving sleeves mounted on the axle, driving means for the sleeves, an operative drive connection between said driving means and the gear, said connection loose on said axle, and an operative drive connection between said axle and said driving means, said last mentioned drive connection being fixed on the axle.

5. A transmission mechanism for the purpose set forth comprising an axle having an actuating member fixed thereto, a driven gear loosely mounted on the axle and provided with abutments impacting against said member for driving the axle, wheel driving sleeves loosely mounted on the axle, means for revolving the sleeves, a drive connection between said gear and means, said connection having adjustable resilient elements, and a drive connection between said means and axle.

6. A transmission mechanism for the purpose set forth comprising an axle having an actuating member fixed thereto, a driven gear loosely mounted on the axle and having means engaging with said member to drive the axle, said gear having a hub provided with arms, a collar loose on the shaft and fixedly connected to the gear and provided with arms, wheel driving sleeves loosely mounted on the axle, means for revolving the sleeves, adjustable resilient drive connections between said arms and means, and drive connections between said axle and sleeves.

7. A transmission mechanism comprising a revoluble axle, driving means therefor, revoluble sleeves mounted on said axle, operative drive connections from said driving means to said sleeves, operative drive connections between said sleeves and said axle, said driving means including cushioned abutments, said drive connections between said driving means and said sleeves being resilient.

In testimony whereof I affix my signature.

CHARLES ESHEL SAYRE.